July 10, 1945.   H. H. HARRIS   2,379,960
TRAVELING WORK SUPPORT
Filed Aug. 5, 1942   2 Sheets-Sheet 2
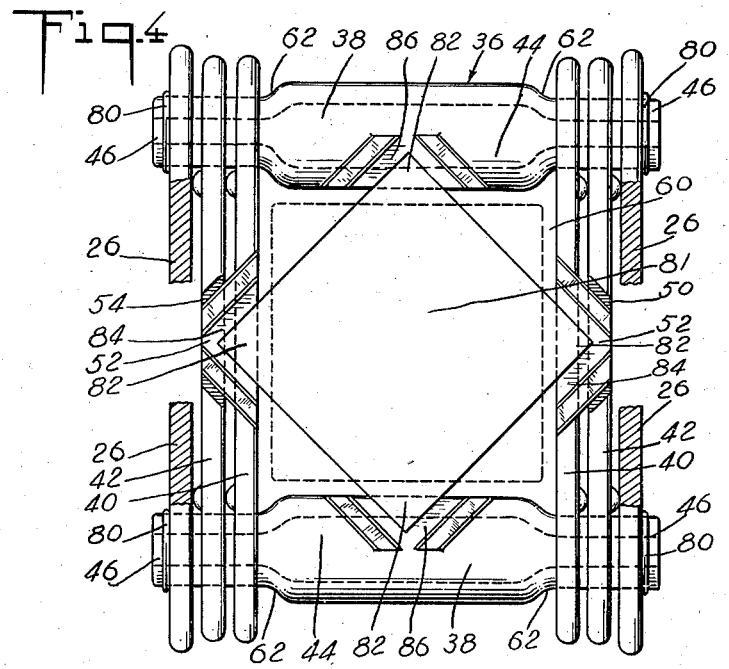
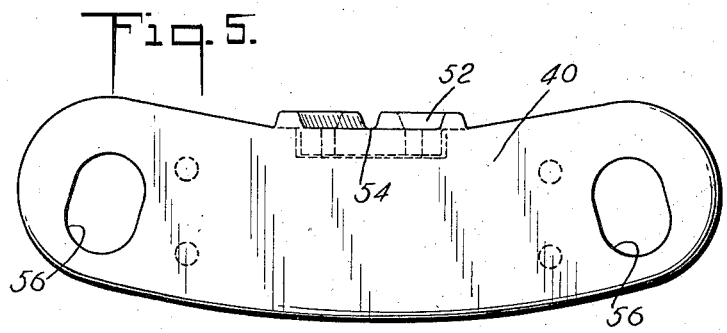
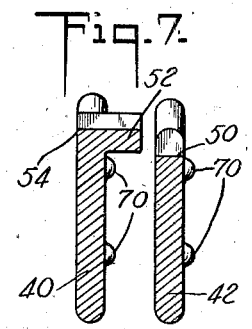
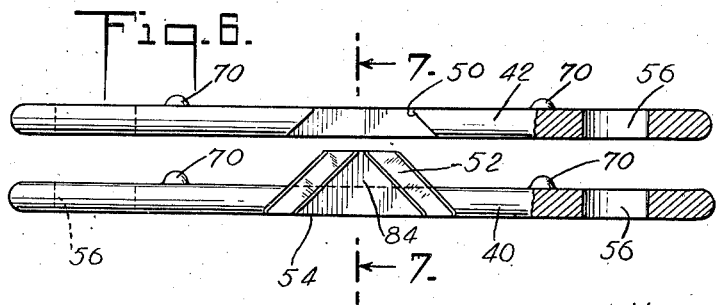
INVENTOR
HENRY H. HARRIS
BY
Scharies and Liberman
ATTORNEY Patented July 10, 1945

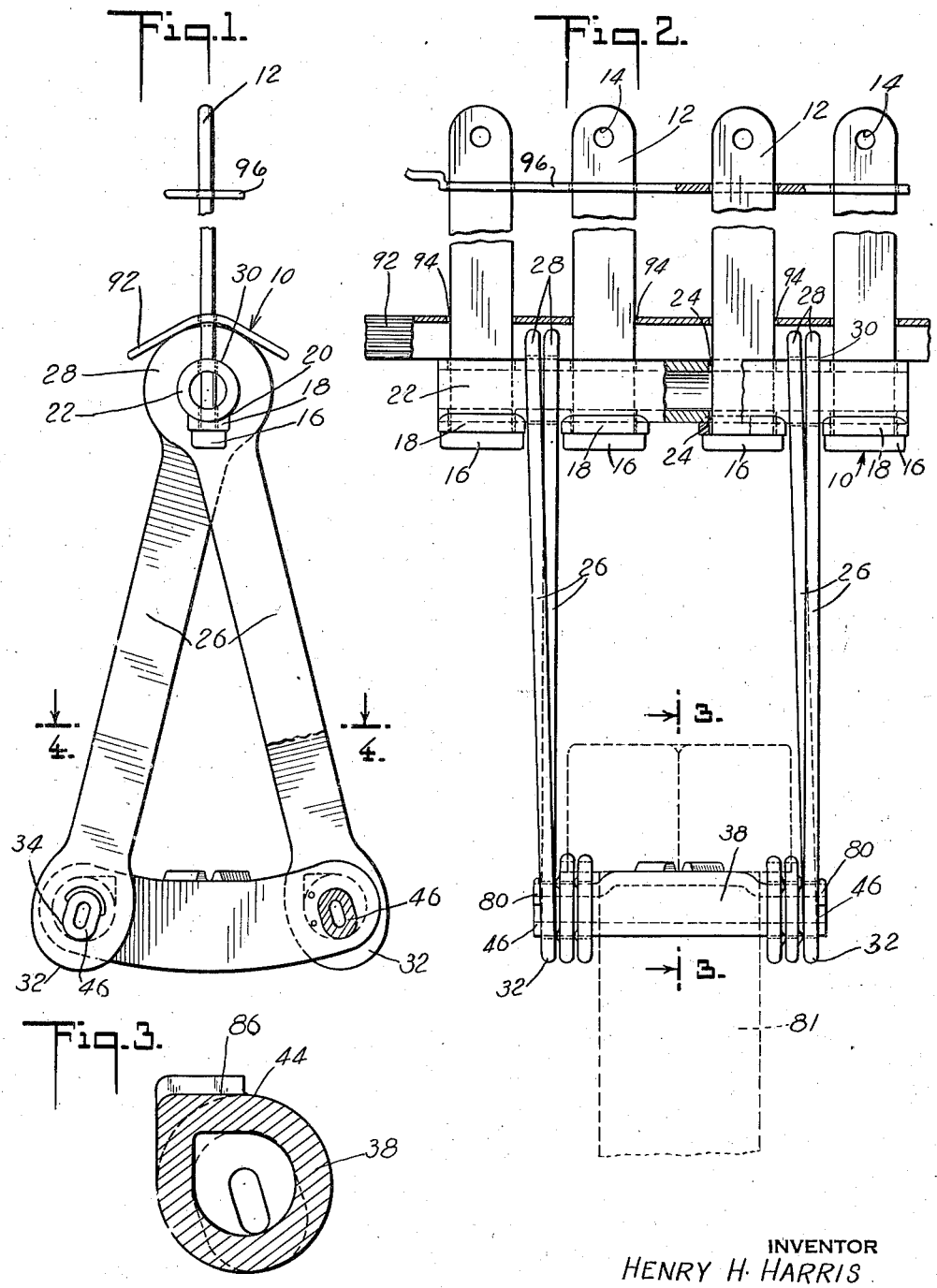

2,379,960

UNITED STATES PATENT OFFICE 2,379,960

TRAVELING WORK SUPPORT

Henry H. Harris, Champaign, Ill.

Application August 5, 1942, Serial No. 453,749

5 Claims. (Cl. 198—131)

My invention relates generally to work supports for use in heat treating furnaces. In particular, my invention relates to work supports adapted to be moved through a number of treating chambers or compartments, in horizontal-chamber heat-treating furnaces of the endless-overhead-conveyor type.

Certain treatments for metals and metal alloys are cyclical; that is, the work being treated passes through a cycle in which it is alternately heated and cooled. The various heat-treating chambers, quenching baths, and the like, are spaced apart from one another, and the work must be supported during the treatments and moved from one chamber to another, as by means of an endless-overhead-conveyor type of mechanism. My invention does not relate to the furnace construction nor to the conveying mechanism, but only to the traveling work supports.

The work supports are subjected to the same heats, more or less intense, the same cooling quenchings, the same reheatings and recoolings as the work itself, and although these traveling work supports, as formerly known, were constructed of high heat- and corrosion-resisting metal alloys, the thermal shocks incident to the cyclical treatments materially shortened their useful lives, caused work stoppages, and necessitated too frequent replacement.

The main object of my invention is the provision of a long lasting support for work that is to be moved from treatment to treatment. Traveling work supports per se are well known, not only in the heat treatment of metals and metal alloys, but also in the glass industry and in the treatment of ceramics, and while, for convenience, I will describe my invention herein as applied to the treatment of metals or metallic alloys, my invention is not to be so limited in its usage, as it is equally applicable to other industries.

Another object of my invention is the provision of a work support and means to suspend same from the conventional overhead endless conveyor type of moving means.

Another object of my invention is the provision of a work support, of skeleton, openwork formation, shaped to receive and secure thereon the work to be treated.

Another object of my invention is the provision of a work supporting platform, the sides and ends of which have means formed thereon to receive and secure the work being treated.

Among other objects of my invention are the provision of a work support of the character described, which is composed of a plurality of parts, which is flexible in use, in which the parts are removably secured together, in which worn or damaged parts may be individually replaced without damage to any other parts; which will resist the thermal shocks resulting from the extreme temperature variations during the cycle; and on which the work being treated may be locked against accidental displacement during movement in the cycle.

Other objects of my invention will in part be obvious, and still others will be specifically pointed out below in connection with the following description of an illustrative embodiment.

In the drawings annexed hereto and forming a part hereof,

Figure 1 is an end elevation of one form of device constructed according to and embodying my invention, a portion of one of the hanger links being broken away;

Fig. 2 is a side elevational view, also partly in section, of the device of Fig. 1;

Fig. 3 is a vertical section through the tubular end support along the line 3—3 of Fig. 2;

Fig. 4 is a top plan view of the support platform along the line 4—4 of Fig. 1;

Fig. 5 is a side elevational view of one of the strap components of the support platform;

Fig. 6 is a top plan view, partly in section, of a pair of strap members, in spaced relation; and Fig. 7 is a section along the line 7—7 of Fig. 6.

My new and improved work support, indicated generally by reference numeral 10, comprises a plurality of hanger bars 12, 12, which project up through the slotted roof in the conventional heat-treating furnaces of the endless-overhead-conveyor type. Hanger bars 12, 12 may be suitably apertured near the upper ends thereof, as at 14, 14 for securement to the conveying mechanism (not shown). At the lower ends thereof, bars 12 are provided with flat-caps 16, 16 extending outwardly therefrom forming inverted T-bars. A vertically apertured saddle block 18 is provided for each hanger bar, the bottom of which is flat and the top of which is concavely curved, as at 20. Blocks 18, 18 receive the stems of the hanger bars 12, 12 therethrough, and when the blocks are threaded onto the hanger bars 12, the flat undersides of the blocks will come to rest on the underside of the bar caps 16 (see Figs. 1 and 2) to form a seating. A hollow tube 22 is provided, of circular section, having a number of diametrically opposed registering apertures 24, 24 therein extending lengthwise of the tube, the apertures 24, 24 permitting tube 22 to be threaded onto hanger bars 12, 12. Thus, as tube 22 is threaded onto bars 12, 12 it passes down the length thereof and is received and supported atop the concaved saddle blocks 18, 18.

The work support platform is suspended from the crosswise mounted tube 22, which is itself supported by hanger bars 12, 12 from the conveying mechanism. The support platform comprises a plurality of hanger links 26, 26, end tubes 38, 38, and side bars 40, 42, all of which are suspended from the cross tube 22.

Hanger links 26, 26 comprise flat, elongated members having enlarged and flattened ends. The upper end 28 of each link is provided with a circular opening 30 therethrough, said opening 30 being slightly wider in diameter than the diameter of cross tube 22, so as to be threadable on the tube. The lower end 32 of each hanger link 26 may also be enlarged, and has an elliptical opening 34 therethrough. Links 26, 26 are arranged and threaded onto the cross-tube 22 in pairs, that is, two hanger links 26, 26 are threaded onto the cross-tube at a time, the distance between each pair being determined by the length of the end tube components of my support, the reason for which will appear below.

I have described my platform herein as adapted to support a gun barrel, or other work, having a square butt portion at the end thereof, although my invention is adapted to support work of different shapes during the cyclical treatment. The work supporting platform 36 of my invention, as illustrated in this embodiment, is square, and comprises two tubular end members 38, 38 which form two opposite sides of the platform, and two pairs of side-straps 40, 42 which form the other two opposite sides of and complete the open-work platform having a square opening 60 in the center thereof.

The end or front and rear members 38, 38 are of hollow tubular construction, formed as by casting or otherwise, the extremities 46 thereof being reduced in size and deformed into elliptical section, so as to fit into similarly shaped openings 56, 34 in the side bars and hanger links respectively.

The side bars 40, 42 are provided and arranged in pairs. Each pair of side bars 40, 42 comprises an inner bar 40 and an outer bar 42, both of which are of the same size, shape and thickness. The bars are thin, flat and relatively elongated, curving downwardly slightly and spaced from each other by a number of small projections 70, 70 formed on the sides thereof. Each pair of bars is interconnected, the top of the outer bar 42 being notched at 50 in the center thereof to receive a shelf 52 extending out from the center of the inner bar 40. Shelf 52 rests on the notched portion 50 of the outer bar, so that any weight on one bar is distributed between and supported by both bars. Elliptical openings 56, 56 are formed in the ends of each of the side bars 40, 42 sized to receive therewithin the reduced extremities 46 of the end tubes 38.

Platform 36 may be assembled by sliding the ends of the side-bar pairs over the extremities 46 of tubes 38, shoulders 62, 62 on the tubes acting as stops to limit the extent of movement. The platform may then be suspended from crosstube 22 by means of the hanger links 26, one at each corner of the platform, the lower end of each link being threaded onto the end of the tubes 38 after the side bars 40, 42 have been threaded thereonto. The hanger links 26, 26 thus serve to maintain the side bars and the end members in their interfitted relation, and are themselves kept from slipping off the tubes by means of lock wire strips 80 welded or otherwise secured to the neck. Each pair of hanger links 26, 26 suspended from cross-tube 22 supports one side of the platform. The hanger links may be threaded onto the cross-tube before the hanger bars are passed through the tube, or they may be arranged on the cross-tube together.

The square butt 81 of the gun barrel may be passed up from below the platform through the square opening 60 in the platform as indicated in dotted lines in Fig. 4. The butt is then turned 45 degrees in either direction and lowered until the corners 82, 82 of the butt will rest on the center of each of the four sides of the platform portion. The tops of the shelves 52, 52 may be flattened and notched as at 84 and the top of end tubes at the center thereof may be notched as at 86, so as to form a seat for the gun butt, having the same shape as the gun butt. As necessary, the sides and ends of the platform 36 may be shaped to receive and secure differently shaped material to be heat treated. In this way, the gun or other work being treated is secured against the accidental displacement, and can be removed only by lifting the gun or other work up out of the seat formed by the four shaped sides of the platform.

A downwardly arched splash plate 92 may be provided, having a number of spaced apertures 94 therein, extending longitudinally of the plate in the crowned center thereof. Plate 92 is threaded down over the upper ends of hanger bars 12, 12 and rested on the enlarged top ends 28, 28 of the hanger links. As the work is moved from heating chamber to quenching bath, the splash plate 92 acts to prevent splattering of the bath contents. Another plate 96, similarly apertured, may be provided and disposed near the top of the hanger bars and below the openings 14, 14 therein, to minimize heat loss through the opening in the furnace roof.

My work support as a whole is composed of a number of individual elements. Failure of any one element, while rendering the support unfit for use, calls for replacement only of that individual element in order to restore the support to usable condition. The tubular construction of the end elements of the platform and the paired arrangement of the side bar components makes for increased weight supporting ability of the work support and increases resistance to thermal shock. The suspension of the platform from the cross-tube by means of the hanger links permits the components of the support as a whole to shift and swing, thereby reducing strains and friction, and the openwork nature of the support permits full and uninterrupted flow of heat to and around the work.

I claim:

1. A movable work support for use in heat treating furnaces of the horizontal-chamber, endless-overhead-conveyor type comprising a platform of openwork formation having a pair of tubular end members, a pair of side members, each pair of the side elements comprising two bars, the side members being threaded onto the end members, and hanger link means to support the platform, the lower ends of said links being threaded onto the end members over the side members and the upper ends of said links being secured to the moving means.

2. In a furnace of the horizontal chamber, endless-overhead-conveyor type, a movable work support comprising a platform and means to support same, the support means comprising a plurality of hanger bars, a cross tube secured to the hanger bars, a plurality of hanger links depending from the cross tube, and said hanger links being secured to the platform.

3. In a furnace of the horizontal chamber, endless-overhead-conveyor type, a horizontally disposed work supporting platform the marginal components of which are formed to receive and secure thereon the work to be treated, means to maintain the platform under suspension comprising a plurality of vertically depending links secured at their lower ends to the platform and at their upper ends to means to removably secure the links to the conveying means, said securing means comprising a horizontally disposed member having vertically extending hanger bars secured to the conveying means.

4. A movable work support for use in heat treating furnaces of the horizontal-chamber, endless-overhead-conveyor type, comprising a platform of open work formation and means to suspend the platform from the moving means, the platform consisting of a pair of spaced-apart side members removably interfitted with a pair of spaced-apart front and rear members, each of the side members consisting of a plurality of interfitted elements, one element of each interfitted pair being shaped to receive the work to be supported thereon to distribute the weight of the work among all the interfitted elements.

5. A movable work support as in claim 4, in which one of the interfitted side member elements is notched, and another of the elements is provided with a laterally extending shelf fitting within the notch and resting thereon, the shelf being shaped to receive the work to be supported thereon.

HENRY H. HARRIS.